June 5, 1956 D. ELDRED 2,749,266
METHOD OF MAKING REINFORCED GLASS FIBER ARTICLES
Filed May 21, 1953
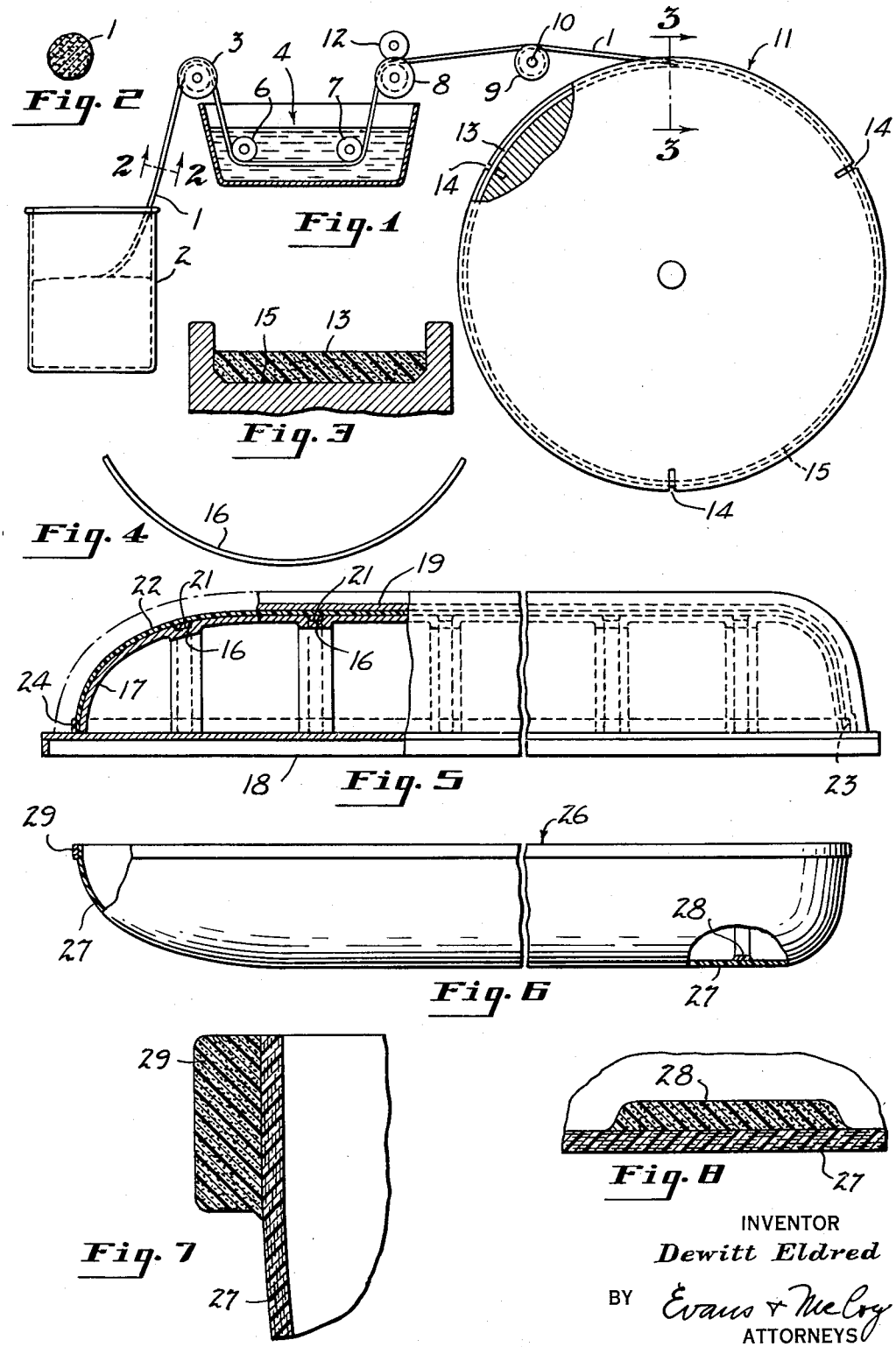
INVENTOR
Dewitt Eldred
BY Evans & McCoy
ATTORNEYS

United States Patent Office 2,749,266
Patented June 5, 1956

2,749,266

METHOD OF MAKING REINFORCED GLASS FIBER ARTICLES

Dewitt Eldred, Peru, Ind., assignor to The General Tire and Rubber Company, Akron, Ohio, a corporation of Ohio Application May 21, 1953, Serial No. 356,459

4 Claims. (Cl. 154—90)

The present invention relates to plastic reinforced products and to a method of making them. In particular, it relates to a method of molding reinforced fiber glass products and reinforced cloth and mat products.

The process of impregnating cloth, mat, or flock preforms with resin and subsequently curing the mat in a mold to produce a shaped product is well known in the art. Several methods of making such products are recognized. One method is to form a pair of matched metal molds, lay the mat, cloth or preform on the male mold, pour resin over the mat, and close the mold and force the resin into the mat under pressure and heat as desired. Another method is to form a female mold, lay the mat in the mold, pour on the resin and work it in, and mold the article between the female mold and an air-bag or similar structure to final form. Still another method is to simply lay mat on a male or female mold, pour on the resin and work it in, and let it set up to final form.

One of the most difficult problems in molding articles in accordance with all of the above mentioned processes is that of providing necessary reinforcement for the article. Examples of articles being molded in accordance with these processes and needing reinforcement are boat hulls, airplane pontoons, tanks, and the like. When a reinforcing rib, edge, or corner of some sort is desired with a thickness of three or four times that of the article, it is very difficult to simply lay up thicker mat or fabric at the desired section and to impregnate the thicker portion with resin.

In the first place, the resin cannot be evenly worked into the thicker reinforcing portion and air-pockets and other imperfections cannot be avoided. Secondly, when considerable pressure is used, as in matched molds, the thicker reinforcing portion tends to move and distort in the direction of the resin flow and it is very difficult to anchor it in place during the molding operation. Still another difficulty is the fact that the thicker portion reinforces only the virtue of increased thickness and is in no way stronger or more rigid than the other portions. In other words, it has no particular strength in any one direction. Finally, since the resin ceannot be evenly distributed in the thicker portion, the thicker portion separates from the body of the article when subject to stress and has very little reinforcing effect.

Attempts have also been made to form separate rib portions or reinforcing portions of resin-impregnated mat or cloth and cement or otherwise adhere them to the article as a reinforcement. It is generally recognized, however, that cured resins do not cement or otherwise adhere to one another with anywhere near the strength of an integral bond. Only with certain more expensive resins, such as the epichlorohydrin type resins, has a firm cement bond ever been achieved. Thus when reinforcing ribs are cemented on the article, they are not satisfactory because they separate at the bond.

Likewise, when metal or wood ribs are employed they must be bolted or riveted in place. This is a difficult and expensive operation and eliminates some of the advantages of the resin-impregnated cloth and mat structure. Furthermore, the resin-impregnated surface of the article often cracks around the bolts and rivets because of the stress concentrations there.

In accordance with the subject invention, I provide a reinforcement rib of resin-impregnated roving of greater strength than the body of the article and one which is integrally formed with the body of the article.

Referring particularly to the drawings in which like numerals refer to like parts, Figure 1 is a schematic front elevation, in section, of an apparatus for dipping the roving in a resin bath and wrapping it on a drum;

Fig. 2 is a sectional view taken along line 2—2 of the Figure 1 showing a cross-section of the roving;

Fig. 3 is an enlarged sectional view of the circumference of the drum taken along line 3—3 of Figure 1 showing the drum circumference with the roving wrapped thereon;

Fig. 4 is a front elevation of a portion of the roving hoop as cut for use as a reinforcing rib;

Fig. 5 is a front elevation with portions broken away showing a mold for a boat together with mat and ribs placed therein;

Fig. 6 is a front elevation with portions broken away showing a boat as molded in the mold of Fig. 5;

Fig. 7 is an enlarged sectional view of the edge or rail portion of the boat taken from Fig. 6; and Fig. 8 is an enlarged sectional view of a bottom portion of the boat showing the reinforcing rib therein.

In accordance with this invention, I make up a reinforcing rib by wrapping resin-dipped fiber tape, thread, yarn or roving under substantial tension about a relatively large drum to form a built-up, annular element. This element, still uncured, is then cut into appropriate sections for use as reinforcing ribs and is placed in grooves provided in the male mold or is laid against the inside surface of the article in the female mold. The rib and surface of the article are then cured together to form an integrally joined structure.

One method of impregnating the fiber reinforcing material as noted above with resin and forming it into a rib is illustrated in Figs. 1–4. The material preferably used is glass-fiber roving. Glass fiber tape or thread can also be employed as can cotton, rayon, and other natural and artificial fiber materials. However, they are not as strong or satisfactory as meterial made from glass fibers. The term fiber material as used herein means any reinforcing material which is impregnated with resin and is made up of a multiplicity of fibers or strands such as the materials above noted.

The glass roving 1 is drawn from a tub or container 2 over roller or pulley 3 and into the resin bath 4. Left hand bath roller 6 and right hand bath roller 7 hold a length of the roving in the bath to impregnate it. The roving 1 is then led out of the bath and over roller or pulley 8, through winding guide pulley 9 and onto the drum or former 11.

Pressure roller 12 rides and presses on the roving as it travels over roller 8 so that excess resin is squeezed out or wiped off the roving and drops back into the bath. Roller 12 is set to press against roller 8 and acts as a drag or brake on the roving to maintain tension in the roving between the roller 8 and drum 11. Other means such as a dancer roll or a brake on roller 8 may also be used as desired in order to provide tension in the roving as it is wrapped about the drum. Winding guide 9 moves freely in a lateral direction on its shaft 10 and directs the roving so that it builds up evenly on the drum. The axis of the shaft is preferably above the plane through the junction of rollers 8 and 12 and tangent to drum 11. Other winding guide means and level winding equipment such as the worm gear arrangements used on fishing reels are also satisfactory. Drum 11 should rotate fast enough so as to pull the roving over rolls 8 and 9 and keep tension in the roving as it is wrapped on the drum.

A cross-section of the circumferential portion of the drum is shown in Fig. 3. From this it is seen that the shape of the groove 15 formed in the circumference of the drum is constructed to provide the rib cross-sectional shape desired. The roving is wound tightly into the groove thus provided to form a solid hoop or annular element 13. The resin impregnation makes the individual roving threads stick tightly together to form a rigid, thoroughly impregnated structure.

Ribs are formed from this structure by cutting the band element thus formed into lengths suitable for ribs. In the apparatus shown, the band element or ring is cut across slots 14 and divided into three equal arcs. After it has been so cut, the rib pieces are easily removed from the drum. In the alternative, the ring can be slid laterally off the drum or the drum collapsed and then it can be cut up as desired. In any case, an arcuate rib element or reinforcing element 16 is formed for reinforcement of the article being manufactured. It should be noted that the reinforcing element, while relatively rigid, can be bent to shape and to conform to the mold upon which it is placed. Also, the resin of the rib should be uncured and "green" and not given time within which to set up. At the same time, it should be set to a solid or gel state and not be liquid.

The drum or form upon which the roving tape or thread is wound does not have to be round but can be elliptical, oval, rectangular or the like to form band elements of such shapes. Any form providing a closed path about which the roving may be wound under tension is satisfactory. The form can even be shaped to form rib sections with a longitudinal shape similar to that of the mold so that they do not have to be bent or deformed in any way and are readily cut from the annular element formed thereon.

The molding process is shown in Fig. 5. Here the male mold 17 rests on support 18. Fitting over the male mold is female mold 19. The male mold is provided with grooves or channels 21 into which the ribs 16 are placed. The ribs, when placed in the grooves, preferably are substantially flush with the surface of the male mold. Glass mat or fabric 22 or other kind of cloth fabric or mat is then placed over the male mold against the ribs. A preform of glass-fiber flock can also be placed over the mold. The female mold is also provided with a groove or rib-receiving channel 23 into which the edge reinforcing rib 24 is fitted.

Resin is then poured over the mat and the molds brought together. The assembly is subjected to heat and pressure and finally the completed article is removed. The impregnated mat and uncured reinforcing ribs are cured together into an integral structure.

A molded article is shown in Figs. 6–8. In this case, the article is a small boat or dinghy 26, but it is understood that the subject process is equally adapted to manufacturing other articles of relatively large, varied surface which require reinforcing ribs. Fig. 7 shows an enlarged cross-section of the surface 27 with the reinforcing rail 29 integral therewith. Fig. 8 likewise shows an enlarged cross-section of surface 27 of the boat with rib 28 integral therewith.

Reinforcing ribs manufactured in accordance with the subject invention can be made with strong unidirectional strength and thus can be used very effectively. A rib built-up of roving or thread laid side-by-side is very strong in tension and lengthwise compressive forces. Likewise, tapes or narrow fabric with directional strength characteristics as desired or combinations thereof can be employed. In any case, none of these materials can be satisfactorily impregnated with resin after they have been formed or built-up because the resin cannot penetrate into the interstices between the fibers.

When the roving is laid onto the drum or form as a plurality of turns while under tension, the kinks and irregularities in the roving are eliminated and a neat lay is provided. The tension in the roving should be at least enough to straighten out kinks and align the fibers in the direction of future stress and it should preferably be enough to distribute the tensile force evenly throughout the cross-section of the roving. Tensile forces amounting up to 80 or more percent of the breaking strength of the roving may be employed. Generally a tension of around 5 percent or more of the tensile strength of the roving is used during the winding operation. As used herein, the term substantial tension means enough tension to straighten out and align the fibers in the roving, yarn, or other fiberous material.

The winding of the roving about a closed path is important to maintain uniform tension throughout the several turns and to thus obtain reinforcing members in which all of the glass fibers are properly stressed. In accordance with this method, even the fibers in the rib sections cut from the rings formed on the drums are in even tension.

In ribs made in accordance with this invention, the concentration of glass fiber in the resin-fiber composition should be at least 50 percent by weight and may be as high as 60 to 65 percent by weight. The ribs are thus very strong and/or much cheaper to fabricate. Ordinary mat and fabric impregnated with resin has a loading of around 30 to 40 percent by weight of glass fiber. The high glass fiber loading greatly increases the strength of the rib because the glass fiber is stronger than the resin. Thus ribs of the subject invention are much superior, in strength per pound, to the surface material of the article.

Any of the conventional resins may be used in accordance with the subject invention. These resins are available commercially and generally comprise a mixture of a polyester and styrene or low pressure, high temperature phenolic resins. The resin can be compounded so as to be heat setting or time setting. In any case, the resin into which the roving is dipped should be compounded so that it does not set up too rapidly and there is time in which to place it on the mold and cure it jointly with the mat or fabric. Thus the resin should not set up for two or three hours and preferably at least eight hours. If the resin is heat setting, however, it should not set up until subjected to heat in the mold. In any case, the resin into which the fiber material forming the rib is dipped must be compounded to cure jointly with the surface of the article being reinforced. The rib cannot be cured prior to location in the mold because it will not be formed integrally with the article surface and will not reinforce it.

It is to be understood that in accordance with the provisions of the patent statutes, variations and modifications of the invention herein shown and described may be made without departing from the spirit of the invention.

What I claim is:

1. A process of molding articles provided with ribs integral with the surface thereof to provide reinforcement therefor comprising the steps of impregnating a fiber material in a resin, wrapping a plurality of turns of said resin dipped, fiber material while in substantial tension about a form to build up a band element, cutting said band element into reinforcing ribs, placing the ribs while in an uncured state in rib-receiving grooves in a mold, and curing resin-impregnated fiber material in contact with said built-up rib to form an integral, reinforced article.

2. A process of molding shaped products of glass fiber and resin to provide integral reinforcing ribs in the products comprising the steps of impregnating glass fiber roving with a resin, wiping off excess resin, wrapping a plurality of strands of said resin impregnated roving about a form under tension to build up an annular element having at least 50 percent glass fiber loading, cutting said element into lengths to form reinforcing ribs, placing said ribs, while in an uncured state, in receiving grooves in a mold, placing glass fiber sheet material over said mold, impregnating said sheet material with resin, and curing said ribs and impregnated sheet material together to form an integral, shaped product.

3. A process of molding shaped products of glass fiber and resin to provide integral reinforcing ribs in the products comprising the steps of impregnating glass fiber roving with a resin, wiping off excess resin, wrapping a plurality of strands of said resin impregnated roving about a form under tension to build up an annular element having at least 50 percent glass fiber loading, cutting said element into lengths to form reinforcing ribs, placing said ribs, while in an uncured state, in receiving grooves in a mold, placing resin impregnated glass fiber sheet material, while in an uncured state, over said mold, and curing said ribs and impregnated sheet material together to form an integral, shaped product.

4. A process of molding shaped products of glass fiber and resin to provide integral reinforcing ribs in the products comprising the steps of impregnating glass fiber roving with a resin, wiping off excess resin, wrapping a plurality of strands of said resin impregnated roving about a form under tension to build up an annular element having at least 50 percent glass fiber loading, cutting said element into lengths to form reinforcing ribs, placing said ribs, while in an uncured state, on resin impregnated, glass fiber sheet material which is in turn resting on a mold and is in an uncured state, and curing said ribs and impregnated sheet material together to form an integral, shaped product.

References Cited in the file of this patent

UNITED STATES PATENTS

| | | |
|---|---|---|
| 2,276,004 | Vidal et al. | Mar. 10, 1942 |
| 2,572,407 | Talet et al. | Oct. 23, 1951 |
| 2,594,693 | Smith | Apr. 29, 1952 |
| 2,596,184 | Sutton | May 13, 1952 |
| 2,602,766 | Francis | July 8, 1952 |
| 2,664,375 | Slayter | Dec. 29, 1953 |

FOREIGN PATENTS

| | | |
|---|---|---|
| 619,674 | Great Britain | Mar. 14, 1949 |

OTHER REFERENCES

Low-Pressure Laminates For Aircraft—British Plastics, December 1951; pages 415–420; pages 419 and 420 particularly relied upon.